US006500527B2

(12) United States Patent
Miller

(10) Patent No.: US 6,500,527 B2
(45) Date of Patent: Dec. 31, 2002

(54) IMAGE RECEPTOR SHEET

(75) Inventor: Alan G. Miller, Austin, TX (US)

(73) Assignee: 3M Innovative Properties Company, St. Paul, MN (US)

(*) Notice: Subject to any disclaimer, the term of this patent is extended or adjusted under 35 U.S.C. 154(b) by 80 days.

(21) Appl. No.: 09/773,859

(22) Filed: Feb. 1, 2001

(65) Prior Publication Data

US 2002/0142141 A1 Oct. 3, 2002

(51) Int. Cl.[7] .......................... B32B 27/14; B32B 3/00

(52) U.S. Cl. ...................... 428/195; 428/325; 428/327; 428/500

(58) Field of Search ................................ 428/195, 325, 428/327, 500

(56) References Cited

U.S. PATENT DOCUMENTS

| | | | | | |
|---|---|---|---|---|---|
| 3,017,280 | A | * | 1/1962 | Yudelson | 106/125 |
| 3,470,136 | A | | 9/1969 | McLendon et al. | 260/75 |
| 3,507,837 | A | | 4/1970 | Hidinger, Jr. | 260/78.4 |
| 3,817,945 | A | | 6/1974 | Oberth et al. | 260/78.4 |
| 3,959,228 | A | | 5/1976 | Massey | 260/75 |
| 4,063,952 | A | * | 12/1977 | Himmelmann et al. | 96/111 |
| 4,490,505 | A | | 12/1984 | Pendergrass, Jr. | 525/591 |
| 5,208,092 | A | | 5/1993 | Iqbal | 428/195 |
| 5,342,688 | A | | 8/1994 | Kitchin et al. | 428/402 |
| 5,389,723 | A | | 2/1995 | Iqbal et al. | 525/57 |
| 5,686,602 | A | | 11/1997 | Farooq et al. | 536/101 |
| 6,387,473 | B1 | * | 5/2002 | Sismondi et al. | 428/195 |

FOREIGN PATENT DOCUMENTS

| | | |
|---|---|---|
| WO | WO 95/16561 | 6/1995 |

OTHER PUBLICATIONS

International Search Report for PCT/US01/17568.

* cited by examiner

*Primary Examiner*—Cynthia H. Kelly
*Assistant Examiner*—B. Shewareged
(74) *Attorney, Agent, or Firm*—Alan Bell

(57) ABSTRACT

An image receiving layer comprising an ink receptive crosslinked polymer comprising the reaction product of a multifunctional aziridine crosslinking agent and a polymer containing protonated pyridine substituents. Image receiving layers may also contain at least one swellable polymer and additives such as particulates, mordants, fillers and the like.

16 Claims, No Drawings

IMAGE RECEPTOR SHEET

FIELD OF THE INVENTION

The invention relates to image receptor sheets that may be stacked without image offset and more particularly to crosslinkable coating compositions applied to film and paper substrates to provide absorbent, ink receiving layers bearing images of high fidelity and color saturation. Image bearing sheets are durable and scuff resistant in the presence or absence of water.

BACKGROUND OF THE INVENTION

The presentation of pictorial and textual images requires materials, as image receptors, that retain evidence of the color, tone, resolution and brightness of the original pictorial subject or textual message. Certain characteristics are required of image receptor materials to provide suitable contrast and fidelity of image reproduction. This need applies particularly to receptors used for recording images formed from colored droplets such as those delivered by ink jet printers and copiers. An image recorded as liquid droplets requires a receptor on which the recording liquid dries quickly without running or spreading. High quality image reproduction using ink jet printing techniques requires receptor substrates, typically sheets of paper or opaque or transparent film, that readily absorb ink droplets while preventing droplet diffusion or migration. Ready absorption of ink encourages image drying while minimizing image migration maintains the sharpness of the appearance of the recorded image.

Advances in ink jet printing technology yielded ink jet printers requiring less time for complete image generation. Improvements in printer technology translate into the need for improved receptor materials that satisfy a number of important requirements related to increasing speeds of multicolor printers. In addition to the need for image sharpness and rapid absorption of ink droplets, there is a demand for image receptors that satisfy quality standards with respect to brightness, opacity, internal strength, and resistance to picking and scuffing. An effective receptor material also protects an image from water damage that would extract color from an image or distort its appearance by image bleeding due to spreading of an area of colored dye.

Solutions to problems associated with the use of aqueous ink jet inks include the use of water swellable polymers, and hydrophilic additives to improve liquid absorption and drying rate. The use of mordants provides control of liquid droplets, as deposited, to enhance image sharpness and limit droplet migration that appears as image bleeding.

Despite improvement in the performance of ink jet image receptors a challenge exists to provide sheet materials so that multiple imaged sheets may be stacked in the output tray of ink jet color printers, without evidence of image transfer between sheets in the stack. Such image transfer is also known as image offset or blocking.

Receptor sheet durability is an issue related to the preservation of recorded images which may be damaged by picking and scuffing. Picking and scuffing could occur during stacking of multiple sheets during high speed printing or copying. Therefore, increased durability may allow stacking of imaged sheets with less blocking, in less time. This is becoming important in response to the increasing image generation speed of ink jet printers.

It is known that introducing crosslink sites into a polymer structure may increase its toughness and durability. The benefits of durability of crosslinked polymers may be applied to image receptor layers. In the case of ink jet imaging, coatings for receptor layers typically comprise water soluble polymers that upon crosslinking become less water soluble with reduced tack and increased durability, especially in imaged areas that are saturated with aqueous-based ink.

A known crosslinking reaction that may be applied to image receptor layers involves the interaction of carboxy terminated materials and multifunctional aziridines. Information of crosslinking of carboxylate species using multifunctional aziridines is available in a number of references exemplified by United States Patents including U.S. Pat. No. 3,470,136; U.S. Pat. No. 3,507,837; U.S. Pat. No. 3,817,945; and U.S. Pat. No. 3,959,228. Further evidence of the use of multifunctional aziridine crosslinking agents with carboxylic acid groups is given in U.S. Pat. No. 4,490,505. This patent teaches the benefit of reacting aziridines with carboxylic acid groups rather than other types of groups, such as primary and secondary amine groups, hydroxyl groups and phenolic groups, which react more slowly with the crosslinking agent.

U.S. Pat. No. 5,208,092 describes the use of multifunctional aziridine crosslinkers for carboxylic acid groups in liquid ink-receptive recording sheets. The crosslinking reaction in this case involves compositions containing from 0.5% to about 20% by weight of at least one ethylenically unsaturated monomer having acidic groups in ammonium salt form. Such groups react to form crosslinks in the presence of a multifunctional aziridine, present from 0.5% to about 8.0% by weight. Illustration is provided of a crosslinking scheme. U.S. Pat. No. 5,389,723 also describes ink receptive layers crosslinkable through reaction of acid groups with polyfunctional aziridines such as propane-tris (β-(N-aziridinyl)propionate. The ink receptive layers may contain pendant ester groups, and these can be rendered crosslinkable by hydrolysis.

As indicated, known crosslinking reactions involving multifunctional aziridine crosslinkers appear to emphasize the benefits of the ready reaction of such crosslinkers with carboxylic acid functionality. Reference to the relative slowness of reactions involving other functional groups suggests the potential inferiority of the crosslinked structures they produce. It could also be inferred that accelerating such reactions, e.g. using more vigorous high temperature conditions, may adversely affect performance properties of the resulting product.

Crosslinked systems derived from carboxylic acid group reaction with multifunctional aziridines have produced useful ink receptor materials. Although apparently less reactive, the possibility exists that other crosslinkable compositions may provide ink receptors having similar or improved properties compared to those operating through the reactivity of carboxylic acid functionality. For this reason there is a need to explore other crosslinking schemes involving multifunctional aziridine crosslinkers as well as their application to image recording products.

SUMMARY OF THE INVENTION

The present invention provides a coated receptor for images formed from droplets of colorants issuing from discharge elements of image reproducing equipment, such as the nozzles of ink jet printers. A coated receptor, according to the present invention, includes an ink receptive layer comprising up to 80% of a homopolymer of a protonated polyvinylpyridine to provide crosslinked polymer networks by reaction with multifunctional aziridines. As an alternative the polymer requirement for an ink receptive layer may be satisfied using a copolymer including protonated pyridinium substituents. The ink receptive layers comprising pyridine-containing homopolymers or copolymers exhibit improved performance with respect to durability, scuff resistance, and image fidelity. They also exhibit water and moisture stability and limit migration that leads to image bleeding. The use of pigmented inks, applied to receptor layers according to the present invention, typically produces images of higher density with less "mud cracking." Coating compositions, used for ink receptive layers possess improved stability for extended periods of time, compared with previously known, carboxylic acid-containing, polymer structures crosslinked using multifunctional aziridines. Receptor layer compositions according to the present invention dry efficiently, after coating, at temperatures that minimize damage to substrate materials including paper and film substrates.

Preparation of a durable receptor layer according to the present invention relies upon a crosslinked polymer network that may be accomplished in at least two ways. In one embodiment of the invention, the structure of a pyridine-containing polymer, that crosslinks via reaction with a multifunctional aziridine, may contain the maximum number of pyridine substituents using a vinyl pyridine homopolymer. High incidence of pyridine groups increases the probability of high crosslink density during reaction with aziridine crosslinkers. Alternatively, a copolymer of vinyl pyridine, containing fewer pyridine groups will result in a lower level of crosslinking depending upon the amount of vinyl pyridine constituent in the copolymer. Anticipating that the durability of a receptor layer will increase with increased crosslinking, adjustment of proportions of vinyl pyridine to other monomers in a copolymer should allow adjustment of receptor layer durability. Due to the dependence of durability on the concentration of pyridine substituents, effective performance of receptor layers in terms of abrasion resistance and scuff resistance is not particularly dependent upon the selection of other monomers, used to form copolymers with vinylpyridine. A wide variety of copolymers may be used providing they include from about 2% to about 95%, preferably about 15% to about 45% pyridine substituents.

Another approach to varying the crosslink density of polymers and copolymers produced using vinyl pyridine involves the protonation of either all or only a portion of available pyridine substituents. Protonation results from the acidification of pyridine containing polymers and copolymers. Acid treatment of such polymers converts pyridine nuclei to positively charged pyridinium substituents suitable for reaction with multifunctional aziridine crosslinkers. Fully protonated polymers provide more highly crosslinked polymer networks than partially protonated polymers based on the same polymer structure. Durability of receptor layers may be varied, therefore, by changing the amount of vinyl pyridine included in a polymer backbone or adjusting the amount of protonating acid. The facility for adjusting the durability of crosslinked polymers also leads to the preparation of self-supporting image receptor layers that may be formed into sheet and film structures without need for a supporting substrate.

Another benefit of protonation is the formation of an internal mordant in receptor layers according to the present invention. The pyridinium groups produced by acidification of pyridine containing polymers also provide charge centers that are beneficial for reducing dye diffusion that leads to bleeding. This added advantage reduces or eliminates dependency on known mordant compounds that may be added to receptor layer compositions according to the present invention.

The previous discussion shows the multiple advantages of receptor layers comprising vinyl pyridine homopolymers and copolymers. Incorporation of such polymers provides variable durability in terms of layer integrity and resistance to rubbing, scuffing and related abrasion. Durability depends on crosslink density developed using multifunctional aziridine crosslinkers that act as catalysts rather than initiators. The catalytic reaction requires polymer protonation with production of pyridinium ions. Pyridinium ions impart mordant capacity to receptor layers according to the present invention. Pyridine containing polymers provide the dual function of crosslinking site and mordant to improve the performance of ink jet image receptors.

More particularly the present invention provides an image receiving layer comprising and ink receptive crosslinked polymer comprising the reaction product of a multifunctional aziridine crosslinking agent and a polymer containing protonated pyridine substituents. Image receiving layers may also contain at least one swellable polymer selected from the group consisting of polyvinyl alcohol, hydroxypropylmethyl cellulose, polyvinylpyrrolidone, hydroxyethylcellulose, hydroxypropylcellulose, polyacrylamide, polyethylene oxide, gelatins, starches, and copolymers and blends thereof. Additional benefits may be derived by inclusion of particulates, mordants, fillers and the like.

Definitions

Terms used herein have the meaning indicated in the following definitions.

The terms "receptor layer" or "image receiving layer" refer to a cured composition that is suitably self supporting to absorb droplets of aqueous-based ink without deteriorating.

A "receptor sheet" includes a receptor layer coated on a substrate to provide added support to the receptor layer. A substrate may be in the form of a paper product or an opaque or transparent resin or polymer film.

The term "ink absorption" or "liquid absorption" refers to the affinity of a receptor layer for aqueous-based inks and related colored liquids so as to attract them into the body of the layer and away from the surface, thus promoting surface drying.

"Aqueous-based ink" refers to ink composed of an aqueous carrier and a colorant such as a dye or pigment dispersion. An aqueous carrier may contain water or a mixture of water and a solvent.

The term "water stability" refers to the capacity of a receptor layer to remain intact in contact with water, during water soaking or application of water as a continuous stream.

"A swellable polymer" is an ink or liquid absorbing material that increases in volume during contact with aqueous-based inks thereby increasing its liquid uptake rate and holding capacity.

The term "durability" refers to that property of a receptor layer that protects it from impact, rubbing and scuffing to preserve the integrity of the receptor layer both before and after the deposit of an image of liquid droplets. Receptor layer durability herein accrues from the provision of a crosslinked structure within the layer.

"A mordant" is a material that interacts with the dyes contained in inks to decrease or prevent their diffusion through the media. Diffusion of dyes, after imaging, results in the spreading of colors from one area to another, often seen as apparent broadening of fine lines during image storage.

The term "bleeding" refers to previously described diffusion of dyes through the media after imaging. Diffusion adversely affects image appearance due to deterioration in the resolution and sharpness of pictorial elements. Bleeding may be lessened or prevented by the use of mordant compounds.

A "functional material" herein refers to a material included in a receptor layer to enhance or improve properties associated with recording, retaining and displaying of images, particularly ink jet printed images.

The term "optional material" refers to a material included in a receptor layer to improve non-image properties, such as handling and feeding or receptor sheets according to the present invention.

"Image offset or blocking" refers to the indiscriminate transfer of liquid ink by contact with other surfaces and objects when an image of ink droplets remains wet too long on the surface of a receptor layer. The same term may be used to describe transfer, between surfaces, of portions of a receptor layer due to lack of internal cohesion of the layer or lack of adhesion to the substrate of an receptor sheet. Such transfer is detrimental to the stacking of multiple receptor sheets since a wet image or fragile receptor layer will tend to transfer to the backside of the next receptor sheet ejected into the output tray of a high speed ink jet printer.

The term "(meth)acrylate" indicates the use of either and acrylate ester or a methacrylate ester.

"Mud cracking" refers to micro-cracking apparent within imaged areas of receptor layers printed with pigmented inks. Micro-cracking adversely affects image quality.

The terms "pyridine substituent" or "pyridine content" refer to pendent groups included in a polymeric structure and the concentration of such groups in a polymer.

"Protonation" refers to the addition of a hydrogen ion to a pyridine substituent to produce a positively charged pyridinium ion attached to a polymeric structure.

Having described improvement in durability and internal mordant capacity the enhancements and benefits provided by receptor layers are described in greater detail hereinbelow with respect to several alternative embodiments of the present invention.

DETAILED DESCRIPTION OF THE INVENTION

The present invention provides receptor layers for images produced during the operation of computer controlled ink jet printers. After application to selected substrates, preferably in the form of sheet materials including paper, and opaque and transparent films, receptor layers preserve desirable appearance characteristics of sharpness without bleeding for images produced by ink jet printers. These characteristics result from properties of the receptor layers that encourage rapid liquid ink absorption yet limit diffusion of ink droplets within the layer. Rapid liquid absorption draws ink away from the surface of a receptor layer to reduce surface spreading or puddling of liquid inks. Removal of surface liquid from imaged sheets produces printed output that is less susceptible to ink transfer between sheets. This, combined with crosslinking, also results in less blocking, during stacking of images from high speed printers. During stacking of imaged sheets, sliding contact occurs between individual sheets as they are delivered to a printer's output tray. Sliding contact may cause surface scuffing as imaged sheets rub together. Image offset also occurs during such contact unless receptor layers possess properties that lead to rapid surface drying and durability.

A distinguishing feature of the present invention is the provision of receptor layers with scuff resistance and increased durability. Resistance to scuffing is possible by the addition of a crosslinking component to receptor layer compositions according to the present invention. There are few suitable crosslinking systems for use in receptor layers for ink jet images. The crosslinking reaction typically occurs under relatively mild drying conditions as needed to prevent damage to thermally sensitive receptor layer bearing substrates, particularly photopaper backings and transparent backings such as polyester films. Also, maintenance of receptor performance requires a substantially irreversible crosslinking reaction. Preferably the reaction occurs at oven temperatures and dwell times that substantially prevent discoloration or damage either to a substrate or to a receptor layer. It will be appreciated that any discoloration of either a receptor layer or a receptor sheet can be detrimental to the appearance of a printed image. Reference to receptor sheet damage may be appreciated considering the types of surface imperfection produced by many polyethylene coated papers that typically blister if heated above 145° C. (290° F.) for longer than 2 minutes.

Crosslinking with multifunctional aziridines is one of a few reactions suitable for use with ink jet image receptor layers. As discussed previously, the crosslinking of polymers containing carboxylic acid functionality with multifunctional aziridines represented one of the few practical approaches for increasing the durability of ink jet receptor layers during the process of manufacturing.

The reaction of multifunctional aziridine crosslinking agents with protonated pyridine functionality, instead of carboxylate functionality offers durable receptor layers that in addition possess the properties of a mordant. Also, this crosslinking system provides water resistant receptor layers retaining images that lose relatively little density when soaked in water. They also show extremely good high humidity bleed performance.

Preferred compositions use multifunctional aziridine crosslinkers with polymers containing pyridine substituents, more particularly protonated pyridine substituents, resulting from the addition of acid to pyridine containing polymers. This alternative provides improved control of coating and thermal curing of receptor layers according to the present invention. For example, crosslinking reactions between multifunctional aziridines and protonated pyridine moieties tend to be less vigorous than reactions between carboxylic acid groups and multifunctional aziridines. This reduction of reactivity provides benefits regarding the storage stability of receptor layer compositions before coating.

In addition to providing desirable improvement in the durability of ink jet image receptor layers the use of multifunctional aziridine crosslinking with e.g. polyvinylpyridine polymers yields cationic species associated with the polymer. The presence of cationic sites on crosslinked polymers in receptor layers according to the present invention contributes to increased mordanting of dyes and less bleeding of recorded images. This benefit is not obtainable with polymers crosslinked via reaction of multifunctional aziridines and carboxylic acid functionality.

The added benefits of increased durability and mordant capacity of receptor layers containing polyvinylpyridine and related polymers arise from the use of a highly charged cationic polymer before crosslinking with multifunctional aziridines. High levels of cationic species with pyridine-containing systems usually occur under acidic conditions. Similar conditions existing during crosslinking of typical carboxylic acid functional polymers lead to accelerated crosslinking activity and less stability of receptor layer compositions before coating. This makes even more surprising the fact that highly protonated polymers, containing pyridine and related functionality, remain relatively unreactive in solution, in the presence of multifunctional aziridines. Measurement of dissociation tendencies reveals a pKa value of approximately 4.5 for carboxylic acid groups and approximately 5.2 for protonated pyridine. Although protonated pyridine and carboxylic acids differ by less than an order of magnitude in pKa values, there is, as indicated above, a marked difference in the reactivity of the two systems. Both have conjugate bases with the ability to act as nucleophiles in ring opening of multifunctional aziridines during crosslinking, but at different rates. As the pH of the coating solution approaches from about 1 to about 3 there is an increase in the rate at which multifunctional aziridine disappears from solution. Rapid consumption of aziridine crosslinker leads to premature gelling of coating compositions based upon carboxylic acid functionality. In contrast, gel formation does not normally occur with compositions containing protonated pyridine functionality, e.g. highly protonated polyvinylpyridine. This was demonstrated by adding a solution of 20 parts of a 10% aqueous solution of 90% protonated polyvinylpyridine and 3 parts of a 10% ethanol solution of a trifunctional aziridine (XAMA-7, available from Sybron Chemicals Inc., Birmingham, N.J.) to 100 parts of a solution of 8.4 g polyvinylalcohol in 100 g of 90:10 ethanol: water mixture. This provided a coating composition of pH 6 that showed no gelling when first prepared or after a period of at least one-week. Receptor layers of this composition exhibited substantially the same performance regardless of the use of a newly prepared or aged coating composition. Addition of various cationic materials to crosslinkable protonated polyvinylpyridine, in the presence of multifunctional aziridines may enhance the performance of receptor layers. For example, cationic alumina sols can be added up to 50% of the formulation solids. The presence of such materials provides improvement towards elimination of mud cracking in pigmented areas of imaged receptor layers according to the present invention. Incompatibility of cationic sols, of the type described above, with receptor layer coating compositions containing multifunctional aziridines and carboxylate functional components denies the same benefits to these crosslinkable systems.

The receptor layer compositions described previously contain polyvinyl alcohol as a water absorbing, water swelling polymer capable of rapidly drawing liquid into the layer and away from the receptor surface. Polyvinyl alcohol is one of a number of swellable polymers that rapidly absorb liquid into the receptor surface. Others liquid swellable materials suitable for this purpose include homopolymers and copolymers such as hydroxypropylmethylcellulose available as METHOCEL from Dow Chemical Company, Midland, Mich., Polyvinylpyrrolidone, hydroxyethylcellulose available under the tradename NATROSOL from Aqualon Company, Palatine, Ill., hydroxypropylcellulose available under the tradename KLUCEL from Hercules Inc., Wilmington, Del., starches, polyethylene oxide, polyacrylamides, gelatin and the like. The crosslinking reaction of polyvinylpyridine that is effective in the presence of polyvinyl alcohol and similar swellable polymers is also effective with copolymers containing vinylpyridine. This allows further modification of receptor layer properties. Suitable copolymers include those containing vinyl pyridine from about 2.0% to about 95.0%, preferably about 15% to about 45%, with the remaining composition made up of monomers selected from the group consisting of (meth) acrylate esters, where the ester groups may be alkyl, hydroxyalkyl, alkoxyalkyl, haloalkyl, poly(ethylene glycol) and the like, as well as acrylamides, n-vinyl pyrrolidone, styrene, substituted styrenes, vinyl ethers and the like. Properties of crosslinked receptor layers may also be varied by adjusting the amounts of acid added to pyridine containing polymers and copolymers to vary the level of protonation of a crosslinkable polymer. Other materials that are useful in crosslinking compositions according to the present invention include various pyridine salts including pyridinium chloride, sulfate, acetate, trifluoroacetate and the like.

The previous description indicates the need for receptor layers containing polyvinylpyridine to also include a water swellable polymeric component, for rapid absorption of liquid image droplets. A swellable polymer may also be used in receptor layer compositions comprising copolymers having pyridinium substituents such as those formed by reaction of vinylpyridine with other suitable monomer species and materials that react to form a crosslinked component that contributes durability and scuff resistance to the layer. The polymer component of a receptor layer composition may act as a binder for other materials contained in a receptor layer. Other materials may include functional materials that enhance image characteristics, or optional materials to improve, e.g. handling and feeding of coated sheets for optimum performance with printing and copying equipment.

Functional materials that improve image characteristics of receptor layers include plasticizers, surfactants, particulate materials and mordants. Particulate materials may be added to receptor layer compositions in any way that results in thorough dispersion of particles. Addition of particulate material in a pre-dispersed condition, such as the use of sols or emulsions, offers some useful advantages. Receptor layers according to the present invention may comprise particulates including alumina sols and cationic emulsions, and the like. Surprisingly, particulate materials appear to reduce mud cracking associated with the deposit of pigmented inks on receptor layers.

It is known that particulate materials contribute both liquid absorption and mordant properties to receptor layers for ink jet images. As a mordant, a particulate helps to restrict liquid diffusion in a receptor layer to preserve image sharpness. The liquid absorbing capacity of a particulate aids the speed at which a liquid departs from the surface of a receptor layer. This improves the surface-drying rate of image receptor sheets that thereafter exhibit lower incidence of image offset to facilitate more rapid stacking of imaged sheets, as required by the capabilities of current ink jet printers.

The presence of particulate materials and crosslinked polymers containing pyridinium functionality provides mordant capacity to receptor layers according to the present invention. A mordant is a material that interacts with dyes, contained in the inks, to decrease or prevent their diffusion through the media. Image bleeding reduces image resolution causing the loss of detail from the pictorial presentation captured by an image receptor layer. To further reduce bleeding, known effective mordant compounds may optionally be added to receptor layers. Mordant compounds are well known to those having skill in the imaging and photographic arts. A variety of mordants exist as additives satisfying the image quality needs of receptor layers according to the present invention.

Optional components to improve handling and sheet feeding characteristics may include additives including plasticizers, surfactants and fillers. Suitable plasticizers for receptor layers according to the present invention include, for example, PYCAL 94 (available from ICI Surfactants, New Castle, Del.) sorbitol xylitol, glycerol, mannitol, pentaerythritol, polyethylene glycols and trimethylol propane. Surfactants may be added to aid the coating of receptor layers. They include preferably nonionic or cationic surfactants. Non-limiting examples include surfactants such as various fluorinated materials, including ZONYL FSO, ZONYL FSO 100, ZONYL FSN, and ZONYL FS-330 (available from DuPont Specialty Chemicals, Memphis, Tenn.), alkylphenol ethoxylates, for example TRITON X-100, and TRITON X45 (available from Union Carbide, Danbury, Conn.), polyoxyethyleneglycol derivatives, for example TWEENS 60, TWEENS 61, TWEENS 65 and TWEENS 80 (available from ICI Americas, Inc., Bridgewater, N.J.), polydimethylsiloxane derivatives, such as SILWET L-7600, SILWET L-7605, and SILWET L-7607 (available from OSi Group, Tarrytown, N.Y.), and acetylenic derivatives, for example SURFYNOL 465 and SURFYNOL 486 (available from Air Products and Chemicals, Inc., Orlando, Fla.).

Filler additives may include a variety of types of powder such as silica, alumina, clays, starches, polyolefin powder, polystyrene powders and those having a specific particle shape including spherical particles available in the form of polymeric microspheres and bead polymers such as polymethylmethacrylate (PMMA) beads.

Coatings of receptor layer compositions may be applied by any of a number of methods for applying fluid layers of selected thickness to transparent and opaque substrates. Suitable methods include knife coating, wire bar coating, gravure coating, and extrusion coating.

Receptor layers according to the present invention may be self-supporting. The capability of such layers to retain image fidelity within a single layer, even during soaking with water, demonstrates that they may be used independent of other supports. Preferably, however, a substrate provides support to a coated and thermally cured receptor layer to obtain the benefits to image quality provided by suitable substrates.

For this purpose, suitable substrate materials include paper structures including filled papers developed particularly for quality photographic print presentation. Substrate materials also include opaque and transparent film backings such as cellulose triacetate or cellulose diacetate, polyethylene naphthalate, polystyrene, and polyesters, especially polyethylene terephthalate. Preferred substrates have a caliper between about 50 microns to about 200 microns and develop a strong bond to receptor layers according to the present invention.

To promote adhesion between a substrate and a receptor layer it may be necessary to prime the surface of the substrate using one or more primers applied in single or multiple layers. Coated primers preferably have a thickness less than 2.0 microns. Examples of priming materials include halogenated phenols dissolved in organic solvents, polyvinylidene chloride and gelatin subbing agents. As an alternative, priming of substrate materials may be accomplished using physical priming methods including surface treatment by corona and plasma discharge.

The use of receptor layers according to the present invention primarily addresses the needs of imaging processes associated with ink jet printers and copiers. Receptor sheets produced for this purpose may also find use in other types of imaging processes. Among these imaging processes there may be included electrophotographic methods and related methods based upon image formation using a plurality of image elements such as toner powder particles and wax-containing fluid droplets.

Receptor layers and receptor sheets according to the present invention will be described, as follows, in terms of examples and performance characteristics. Such examples are provided for the purpose of illustration without limiting the scope of the invention.

EXPERIMENTAL

Solution and Dispersion Preparation

Solution A was prepared by dissolving 8.4 g of AIRVOL 540 polyvinyl alcohol in 100 mls of a 90:10 mixture of distilled water and ethanol Solution B was prepared by treating 5.0 g polyvinylpyridine with 2.5 g glacial acetic acid and adding water to give 50 g of a solution approximately 10% in polyvinyl pyridine, protonated to 90%.

Solution C was prepared by dissolving 10 g of a multifunctional aziridine (XAMA-2) in 90 g of ethanol.

Solution D was prepared by dissolving 7.5 g METHOCEL K35 in 92.5 g of water.

Solution E was a copolymer prepared as a 25% solids solution in a 90:10 mixture of distilled water and ethanol. The copolymer contained ethyl acrylate (EA), hydroxy propyl acrylate (HPA), N-vinylpyrrolidone (NVP), and vinylpyridine (VPy) in the proportions 20:20:30:30.

Solution F was made from 10 g of Solution E to which 0.35 g glacial acetic acid was added, followed by dilution to 25 g with distilled water.

Solution G was a 20% solution of a mordant (DYEFIX 3152 available from Sybron Chemicals, Birmingham, N.J.) in water.

Solution H was a 20% solution of a mordant (VANTOCIL available from Avecia, Wilmington, Del.) in water.

Solution I was a copolymer containing EA/ HPA/NVP/ VPy in the proportions 20:40:10:30 at 24.6% solids in a water ethanol mixture, as above.

Solution J was a 20% solids solution of the copolymer neutralized with trifluoroacetic acid, prepared by adding 3.55 g of ethanol and 1.56 g trifluoroacetic acid to 20 g of Solution I.

Solution K was made by dissolving 10 g polyethyleneimine (water-free grade, available from BASF Corporation, Budd Lake, N.J.) in 267 g water, followed by addition of 13.3 g trifluoroacetic acid.

Dispersion I was an alumina sol containing 25% solids in water and available as DISPAL 23N4-20 from Condea Vista, Tucson, Ariz.

Dispersion II was an experimental alumina sol containing 15% solids in water and available as DISPAL 954-25 from Condea Vista, Tucson, Ariz.

Dispersion III was made by dispersing 5 g of polymethylmethacrylate (PMMA) beads, 40 microns in diameter, in 95 g water.

TABLE 1

Compositions of Receptor Layers

| Material | Example C1 | Example 1 | Example 2 | Example 3 | Example 4 |
|---|---|---|---|---|---|
| Solution A | 10.0 g | 10.0 g | | | |
| Solution B | 2.0 g | 2.0 g | 4.5 g | | |
| Solution C | | 0.3 g | 0.67 g | 0.44 g | 0.24 g |
| Solution D | | | 15.0 g | 4.0 g | 15.0 g |

TABLE 1-continued

Compositions of Receptor Layers

| Material | Example C1 | Example 1 | Example 2 | Example 3 | Example 4 |
|---|---|---|---|---|---|
| Solution F | | | | 3.09 g | |
| Solution G | | | | 0.22 g | |
| Solution H | | | | 0.22 g | |
| Solution J | | | | | 3.67 g |
| Solution K | | | | | 0.86 g |
| Dispersion I | | | 2.5 g | | |
| Dispersion II | | | | 1.18 g | 2.46 g |
| Dispersion III | | | | | 0.49 g |

Coating Preparation

Compositions of Examples 1–3 were coated on a primed white microvoided polyethylene terephthalate at a thickness of 175–200 microns (7 mil). The resulting coated sheet was dried at about 130° C. to about140° C. (265° F. to 285° F.) for times in the range of 1 minute to 3 minutes to provide a colorless glossy image receptive layer.

Image Formation

Film sheets coated with receptor layers were imaged using a Hewlett Packard 970C ink jet printer operating in HP Premium Plus Photo Paper Glossy mode. This generates a three color process black, versus a monochrome pigmented black image.

TEST RESULTS

COMPARISON OF EXAMPLE C1 WITH EXAMPLE 1

Example C1 has the same composition as Example 1 with the omission of multifunctional aziridine crosslinking agent (XAMA-2). This example demonstrates the increased durability due to crosslinking, the stability of the coating solution at pH 6, and the mordant properties of protonated polyvinylpyridine polymers crosslinked, by multifunctional aziridines, in the presence of polyvinyl alcohol.

Ten minutes after imaging, the application of a stream of water to imaged samples followed by abrading of receptor layers of Example C1 and Example 1 shows the dramatic improvement of polymer crosslinking. Exposure to water caused the receptor layer of Example C1 to disintegrate and disappear from the film backing. The same treatment of Example 1 did not appear to disturb the image, which was sharply defined and appeared to have lost none of its color.

After aging for forty eight hours the solutions of Example C1 and Example 1 were again coated, imaged and tested with the same results as reported above.

Example 1, produced using the aged coating composition, was further tested by immersion in water for sixty-four days. Table 2 provides a comparison of initial versus final image densities. Reflective image densities were measured using a MacBeth Densitometer incorporating Status A filters such that the red and magenta images were measured with a green filter, blue and cyan images were measured with a red filter and black image portions were measured with a yellow filter.

TABLE 2

Image Density Comparison After Water Immersion for 64 Days

| IMAGE | RED | MAGENTA | BLUE | CYAN | BLACK |
|---|---|---|---|---|---|
| Initial Densities | 1.76 | 2.50 | 2.30 | 1.32 | 2.08 |
| Final Densities | 1.22 | 1.71 | 1.71 | 0.99 | 1.20 |
| % Loss | 30.7 | 31.6 | 25.7 | 25.0 | 42.3 |

EXAMPLE 2

This example demonstrates the use of METHOCEL K35 in place of polyvinyl alcohol (AIRVOL 540). Inclusion of additives such as DISPAL 23N4-20 shows that cationic materials, such as alumina sols, are compatible with receptor layer compositions according to the present invention.

Example 2 was subjected to the same test procedures as Example C1 and Example 1 including extended immersion for a period of sixty days. Regardless of the duration of the water soak procedure, the receptor layer of Example 2 retained a high density legible image.

EXAMPLE 3

This example demonstrates the use of copolymers containing vinylpyridine substituents. In this case the solution was coated at 7 mil wet thickness onto a resin coated photopaper and dried at 130° C. (265° F.) for about 1.75 minutes to give a very glossy, colorless receptor layer. An ink jet image was deposited and after ten minutes the imaged sheet was tested using the same procedures described for Examples 1 and 2. As with the previous examples, the receptor layer of Example 3 retained a high density legible image.

EXAMPLE 4

Example 4 provides a transparency film coated with a receptor layer having significant resistance to blocking in a stack of image receptor sheets. The composition of Example 4 (Table 1) was coated on polyvinylidene chloride primed, polyethylene terephthalate (PET) film 100 microns (3.9 mil) thick at approximately 125 microns (5.0 mils) wet thickness using a knife bar coater. It was thereafter dried at about 143° C. (290° F.) to provide a transparent sheet having a receptor layer dry coating weight of 1.1 g/square foot.

After conditioning at 75° F./50% relative humidity for two hours receptor sheets of Example 4 were printed with a series of 100% fill colored and black square shaped areas generated by a Hewlett Packard Deskjet 970C inkjet printer with the HP Premium Transparency Normal mode selected. Approximately 30 seconds after depositing the image squares on the receptor sheet, a second sheet of uncoated polyester film (PET) was placed on the imaged surface of the sheet. An additional eleven sheets of uncoated polyester were placed over the first uncoated sheet to produce a multiple sheet stack that applied a weight of approximately 114 g to the imaged surface of the receptor sheet. After 30 minutes, the sheets were separated. There was no evidence of image transfer to the uncoated polyester sheet either by wetting out or damage to the receptor layer of the sample sheet of Experiment 4. Also, the durability of the sheet was demonstrated when attempts to smudge the black imaged areas resulted in essentially no damage.

The receptor sheet of Experiment 4 shows superior performance compared to transparency sheets currently recommended for use with Hewlett Packard Deskjet 970C inkjet printers, i.e. HP Premium Transparency Film™. A stack of sheets, formed as previously described, using HP Premium Transparency™ film as the receptor sheet, showed evidence of significant transfer of the black imaged areas. Image transfer, due to ink migration to the backside of the film in contact with the transparency sheet, was sufficient to ruin the appearance of the printed image.

As required, details of the present invention are disclosed herein; however, it is to be understood that the disclosed embodiments are merely exemplary. Therefore, specific structural and functional details disclosed herein are not to be interpreted as limiting, but merely as a basis for the claims and as a representative basis for teaching one skilled in the art to variously employ the present invention.

What is claimed is:

1. An image receiving layer comprising:

an ink receptive crosslinked polymer comprising the reaction product of a multifunctional aziridine crosslinking agent and a polymer containing protonated pyridine substituents.

2. The image receiving layer of claim 1 further comprising at least one swellable polymer.

3. The image receiving layer of claim 2 wherein said swellable polymer is selected from the group consisting of polyvinyl alcohol, hydroxypropylmethyl cellulose, polyvinylpyrrolidone, hydroxyethylcellulose, hydroxypropylcellulose, polyacrylamide, polyethylene oxide, gelatins, starches, and copolymers and blends thereof.

4. The image receiving layer of claim 2 further comprising at least one mordant.

5. The image receiving layer of claim 2 further comprising at least one particulate additive selected from the group consisting of metal oxide sols and cationic emulsions.

6. The image receiving layer of claim 2 further comprising a filler selected from the group consisting of silica, alumina, clays, starches, polymethylmethacrylate (PMMA) particles and beads, polyolefin powders and polystyrene powders.

7. The image receiving layer of claim 2 wherein said protonated polymer has from about 2% to about 95% pyridine substituents.

8. The image receiving layer of claim 2 wherein said protonated polymer has from about 15% to about 45% pyridine substituents.

9. An image receptor sheet comprising:

a substrate; and an ink receptive crosslinked polymer comprising the reaction product of a multifunctional aziridine crosslinking agent and a polymer containing protonated pyridine substituents.

10. The image receptor sheet of claim 9 further comprising at least one swellable polymer.

11. The image receptor sheet of claim 10 wherein said swellable polymer is selected from the group consisting of polyvinyl alcohol, hydroxypropylmethyl cellulose, polyvinylpyrrolidone, hydroxyethylcellulose, hydroxypropylcellulose, polyacrylamide, polyethylene oxide, gelatins, starches, and copolymers and blends thereof.

12. The image receptor sheet of claim 10 further comprising at least one mordant.

13. The image receptor sheet of claim 10 further comprising at least one particulate additive selected from the group consisting of metal oxide sols and cationic emulsions.

14. The image receptor sheet of claim 10 wherein said protonated polymer has from about 2% to about 95% pyridine substituents.

15. The image receptor sheet of claim 10 wherein said protonated polymer has from about 15% to about 45% pyridine substituents.

16. An image receptor sheet comprising:

a substrate; and a single ink receptive layer including a crosslinked polymer comprising the reaction product of a multifunctional aziridine crosslinking agent and a polymer baying substituents including pyridinium ions, said crosslinked polymer providing mordant capacity and durability to said ink receptive layer.

* * * * *

UNITED STATES PATENT AND TRADEMARK OFFICE

CERTIFICATE OF CORRECTION

PATENT NO. : 6,500,527 B2
DATED : December 31, 2002
INVENTOR(S) : Miller, Alan G.

It is certified that error appears in the above-identified patent and that said Letters Patent is hereby corrected as shown below:

Title page,
Item [74], "*Attorney, Agent or Firm* – Alan Bell" should read -- [74] *Attorney, Agent or Firm* – Alan Ball --.

Column 14,
Lines 36-37, "baying" should read -- having --.

Signed and Sealed this

Eighth Day of April, 2003

JAMES E. ROGAN
*Director of the United States Patent and Trademark Office*